United States Patent
Polisetty et al.

(10) Patent No.: US 8,154,450 B2
(45) Date of Patent: Apr. 10, 2012

(54) OPTIMIZATION FOR FINDING DIRECTION OF ARRIVAL IN SMART ANTENNAS

(75) Inventors: Chandra Mouli Polisetty, Parvathi Puram (IN); Venu Gopal Rao Mullu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 12/478,991

(22) Filed: Jun. 5, 2009

(65) Prior Publication Data

US 2010/0309048 A1    Dec. 9, 2010

(51) Int. Cl.
*H01Q 3/00*    (2006.01)
*G01S 19/51*    (2010.01)

(52) U.S. Cl. .................... 342/359; 342/357.34
(58) Field of Classification Search .............. 342/359, 342/357.34
See application file for complete search history.

(56) References Cited

U.S. PATENT DOCUMENTS

| | | | |
|---|---|---|---|
| 5,943,013 A * | 8/1999 | Ohashi | 342/417 |
| 6,512,481 B1 * | 1/2003 | Velazquez et al. | 342/367 |
| 2002/0111174 A1 | 8/2002 | Judson et al. | |
| 2004/0104839 A1 | 6/2004 | Velazquez et al. | |

FOREIGN PATENT DOCUMENTS

EP    1233543    8/2002

OTHER PUBLICATIONS

Di Claudio et al., "WAVES: Weighted Average of Signal Subspaces for Robust Wideband Direction Finding", IEEE Transactions on Signal Processing, vol. 49, No. 10, Oct. 2001.*
International Search Report and Written Opinion—PCT/US2010/037552, International Search Authority—European Patent Office—Sep. 1, 2010.
Schmidt R 0: "Multiple Emitter Location and Signal Parameter Estimation" IEEE Transactions on Antennas and Propagation, IEEE Service Center, Piscataway, NJ, US LNKDD0I: 10.1109/TAP.1986.1143830, vol. AP-34, No. 3, Mar. 1, 1986, pp. 276-280.

* cited by examiner

*Primary Examiner* — Thomas Tarcza
*Assistant Examiner* — Frank McGue
(74) *Attorney, Agent, or Firm* — Kenyon S. Jenckes; Espartaco Diaz Hidalgo

(57) ABSTRACT

A smart antenna system may exploit space diversity by employing an array of antennas whose radiation pattern can be aligned in a direction of arrival (DoA) of a specific signal to be decoded. Smart antennas can be installed on a base station side and/or on a user terminal side. Certain embodiments of the present disclosure provide methods for computationally efficient and accurate searching of the DoA of a specific transmitted signal. The proposed methods utilize Assisted Global Positioning System (A-GPS) coordinates to determine the DoA.

24 Claims, 5 Drawing Sheets

OPTIMIZATION FOR FINDING DIRECTION OF ARRIVAL IN SMART ANTENNAS

TECHNICAL FIELD

The present disclosure generally relates to wireless communication systems, and more specifically to a method for searching of a direction of arrival of a transmitted signal.

BACKGROUND

A smart antenna system exploits space diversity by employing an array of antennas whose radiation pattern can be aligned in a direction of arrival (DoA) of a specific signal to be detected. As a result, a Quality of Service (QoS) can be improved, co-channel interference can be reduced, and a capacity of the system can be increased.

Smart antennas can be installed on a base station side or on a user terminal side. When smart antennas are employed at the base station, a DoA of a desired signal transmitted from a source of interest (i.e., user terminal) needs to be determined. Once the DoA is computed, then a radiation pattern (beam) of smart antennas can be oriented in the desired direction using some beam forming technique instead of utilizing uniform radiation pattern. As the user terminal moves around the cell, the smart antenna system updates the DoA and aligns the radiation beam at the base station in the direction of the user terminal. On the other hand, when smart antennas are employed at the user terminal, it is required to determine a DoA of a signal transmitted from a serving base station.

In an exemplary case when smart antennas are implemented at the base station, a sub-space analysis algorithm can be applied at the base station in order to find the DoA of a signal transmitted from a specific user terminal, such as MUltiple SIgnal Classification (MUSIC) algorithm or Estimation of Signal Parameters via Rotational Invariance Techniques (ESPRIT) algorithm. Both of these algorithms start searching from one point in space and search the entire space of interest. Computational complexity of these algorithms increases exponentially as the number of active user terminals in the system increases. Because of high computational complexity of sub-space searching algorithms, a special dedicated digital signal processor (DSP) can be required to be implemented at the base station for computing directions of arrivals of all served user terminals in the system. Moreover, these searching algorithms can have limited accuracy, especially if a large space needs to be examined.

Therefore, there is a need in the art for a method that simplifies search for a direction of arrival of a specific signal while providing sufficient accuracy.

SUMMARY

Certain embodiments of the present disclosure provide a method for a wireless device. The method generally includes receiving an Assisted Global Positioning System (A-GPS) estimate of global coordinates of an another wireless device, using the received A-GPS estimate of global coordinates to determine a direction of arrival (DoA) of a signal transmitted from the other wireless device, aligning an antenna radiation pattern at the wireless device based on the determined DoA, and communicating with the other wireless device using the aligned antenna radiation pattern.

Certain embodiments of the present disclosure provide an apparatus for a wireless device. The apparatus generally includes logic for receiving an Assisted Global Positioning System (A-GPS) estimate of global coordinates of an another wireless device, logic for using the received A-GPS estimate of global coordinates to determine a direction of arrival (DoA) of a signal transmitted from the other wireless device, logic for aligning an antenna radiation pattern at the wireless device based on the determined DoA, and logic for communicating with the other wireless device using the aligned antenna radiation pattern.

Certain embodiments of the present disclosure provide an apparatus for a wireless device. The apparatus generally includes means for receiving an Assisted Global Positioning System (A-GPS) estimate of global coordinates of an another wireless device, means for using the received A-GPS estimate of global coordinates to determine a direction of arrival (DoA) of a signal transmitted from the other wireless device, means for aligning an antenna radiation pattern at the wireless device based on the determined DoA, and means for communicating with the other wireless device using the aligned antenna radiation pattern.

Certain embodiments of the present disclosure provide a computer-program product for a wireless device, comprising a computer readable medium having instructions stored thereon, the instructions being executable by one or more processors. The instructions generally include instructions for receiving an Assisted Global Positioning System (A-GPS) estimate of global coordinates of an another wireless device, instructions for using the received A-GPS estimate of global coordinates to determine a direction of arrival (DoA) of a signal transmitted from the other wireless device, instructions for aligning an antenna radiation pattern at the wireless device based on the determined DoA, and instructions for communicating with the other wireless device using the aligned antenna radiation pattern.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 October 2005" in October 2005 for mobile BWA systems. The latest revision of the IEEE 802.16-2004, "IEEE P802.16Rev2/D8 December 2008", a draft standard, now consolidates materials from IEEE 802.16e and corrigendum. The standards define four different physical layers (PHYs) and one medium access control (MAC) layer. The OFDM and OFDMA physical layer of the four physical layers are the most popular in the fixed and mobile BWA areas respectively.

Figure 1:
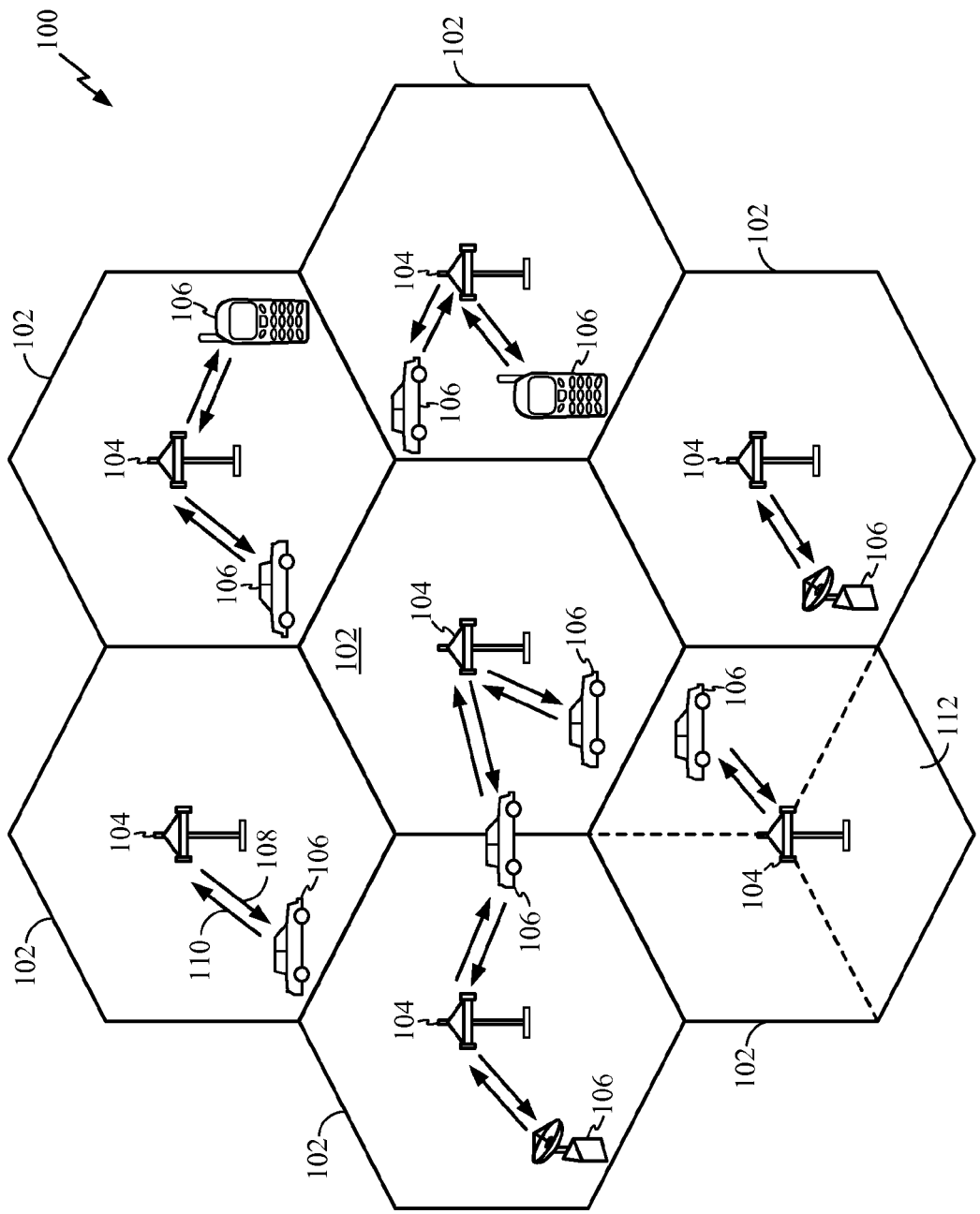
FIG. 1 illustrates an example wireless communication system, in accordance with certain embodiments of the present disclosure.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
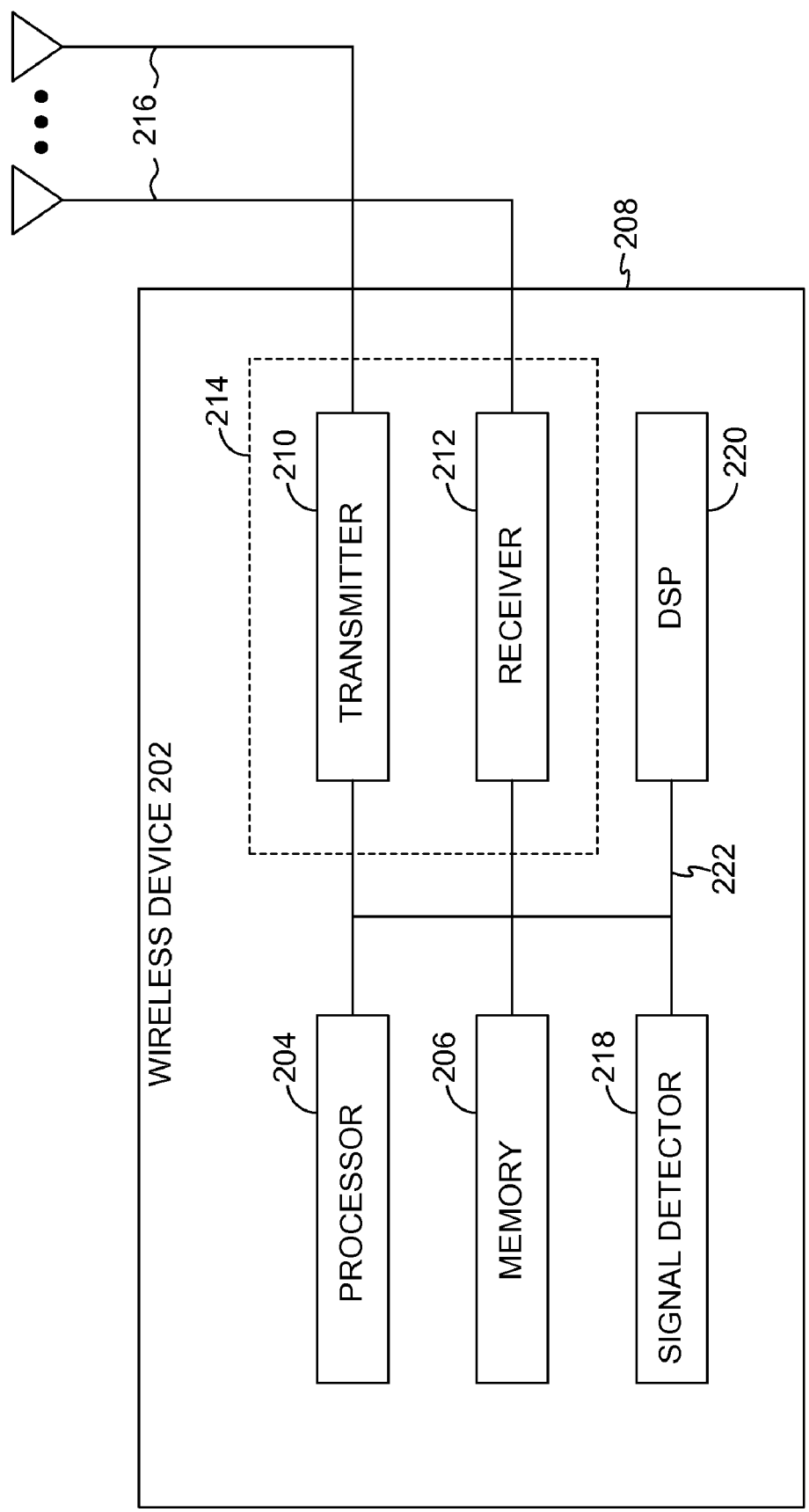
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
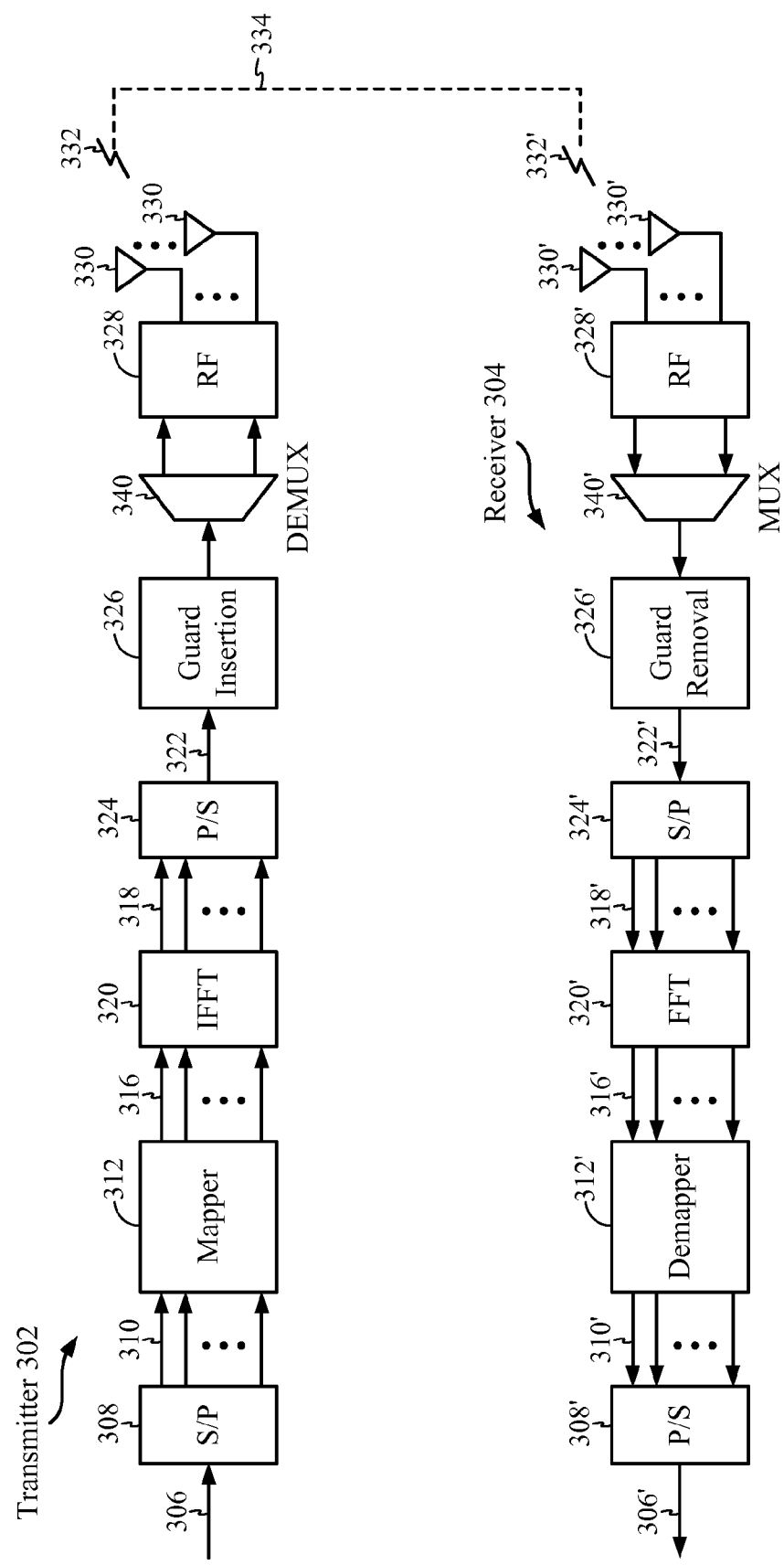
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, $N_s$, is equal to $N_{CP}$ (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The signal from the guard insertion component 326 may then be input into demultiplexer 340 to generate different data streams for a plurality of transmit antennas (or equivalently, spatial subchannels). After that, the base-band data stream for each antenna can be upconverted to a desired transmit frequency band by a radio frequency (RF) front end 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by an RF front end 328' and converted into a single stream by multiplexer 340'. A guard removal component 326'may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 350'.

For certain embodiments of the present disclosure, the wireless system 100 can be considered to be a smart antenna system. The smart antenna system employs an array of antennas whose radiation pattern can be aligned in a direction of arrival (DoA) of a receiving signal to be decoded. Smart antennas can be installed on the base station 104 and/or on the user terminal 106. In order to properly align radiation pattern of smart antennas for maximizing strength of a specific receive signal, it is required to determine the DoA of this signal. The present disclosure proposes methods for computationally efficient and accurate searching for the DoA. The proposed methods utilize Assisted Global Positioning System (A-GPS) estimates of global coordinates that may be available at any wireless device. The A-GPS estimate may be even available inside a house or in a deep tunnel.

Efficient Methods for Finding Direction of Arrival

Figure 4:
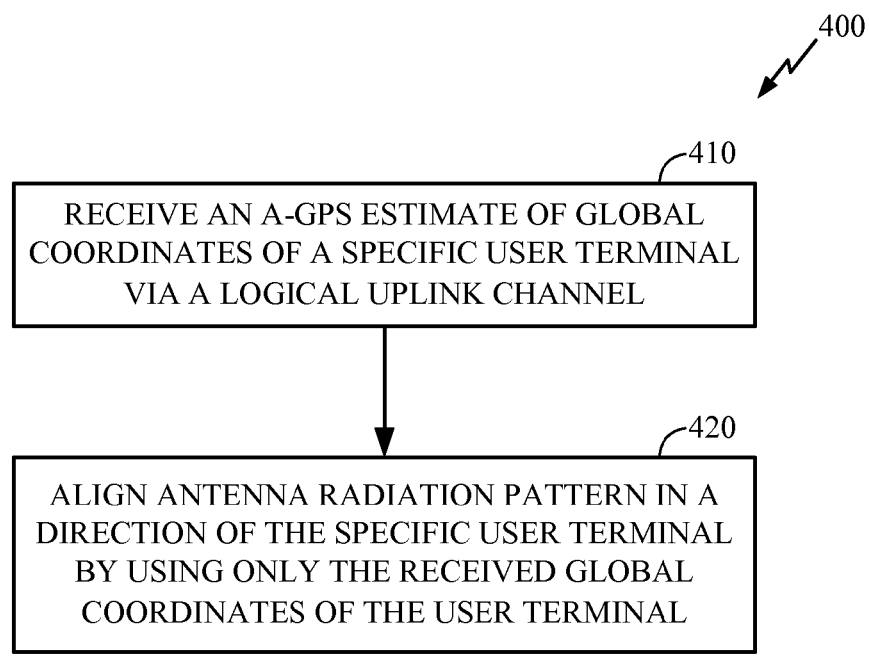
FIG. 4 illustrates example operations for determining a direction of arrival of a specific transmitted signal using only an Assisted Global Positioning System (A-GPS) estimate of global coordinates in accordance with certain embodiments of the present disclosure.

FIG. 4 illustrates example operations 400 that may be applied at a base station to determine a DoA of a signal transmitted from a specific user terminal using only an A-GPS estimate of user terminal's global coordinates. At 410, the base station may receive the A-GPS estimate of global coordinates of the specific user terminal via a logical uplink channel. After receiving the A-GPS estimate of global coordinates, the base station may directly use these coordinates in order to align its antenna radiation pattern in the direction of the user terminal (i.e. to beam-form in the direction of the user terminal), at 420.

For certain embodiments of the present disclosure, smart antennas can be also installed at a user terminal. In this case, a serving base station may send its A-GPS estimate of global coordinates to the served user terminal, and then, based on these global coordinates, the user terminal can align its antenna radiation pattern in the direction of the base station.

By applying the proposed method, installation at the base station and/or user terminal of any special DoA computation processor may not be required. Furthermore, errors in determining DoA using known sub-space search algorithms can be avoided.

The accuracy of locating the specific user terminal may be further improved at the base station if the A-GPS estimate of user terminal's global coordinates is utilized as a starting point of the search in the sub-space search algorithms, such as MUSIC and ESPRIT algorithms. As a result, the DoA search algorithms may determine a location of the specific user terminal with smaller computational complexity and with improved accuracy.

Figure 5:
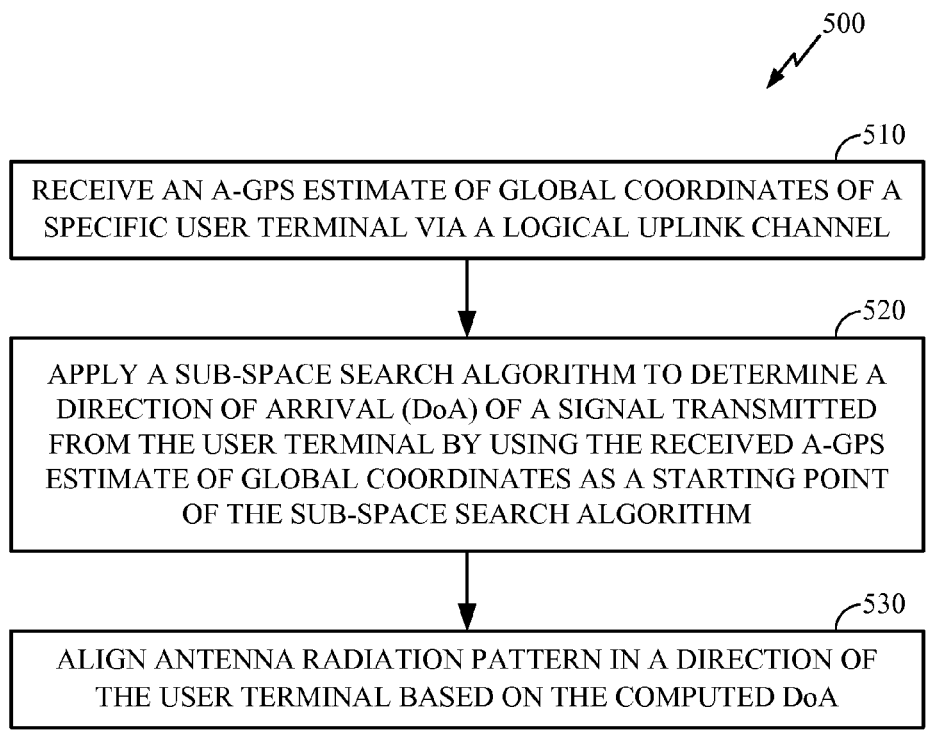
FIG. 5 illustrates example operations for determining a direction of arrival of a specific transmitted signal by using an A-GPS estimate of global coordinates as a starting point of a sub-space search algorithm in accordance with certain embodiments of the present disclosure.

FIG. 5 illustrates example operations 500 that may be applied at the base station to determine a DoA of a signal transmitted from the specific user terminal by employing A-GPS estimate of user terminal's global coordinates as a starting point of a sub-space search algorithm. At 510, the base station may receive the A-GPS estimate of global coordinates of the specific user terminal via a logical uplink channel. At 520, the base station may apply the sub-space search algorithm to determine the DoA of the signal transmitted from the specific user terminal by using the received A-GPS estimate of user terminal's global coordinates as a starting point of the DoA search algorithm. Once the location of the specific user terminal is determined, the base station may align its antenna radiation pattern in the direction of the specific user terminal (i.e. to beam-form in the direction of the specific user terminal), at 530.

Certain embodiments of the present disclosure support installation of smart antennas at a user terminal. In this case, a serving base station may send its A-GPS estimate of global coordinates to the served user terminal. The user terminal may use the received A-GPS estimate as a starting point of a sub-space search algorithm. Once the location of the serving base station is determined, the user terminal may align its antenna radiation pattern in the direction of the base station.

Figure 4A:
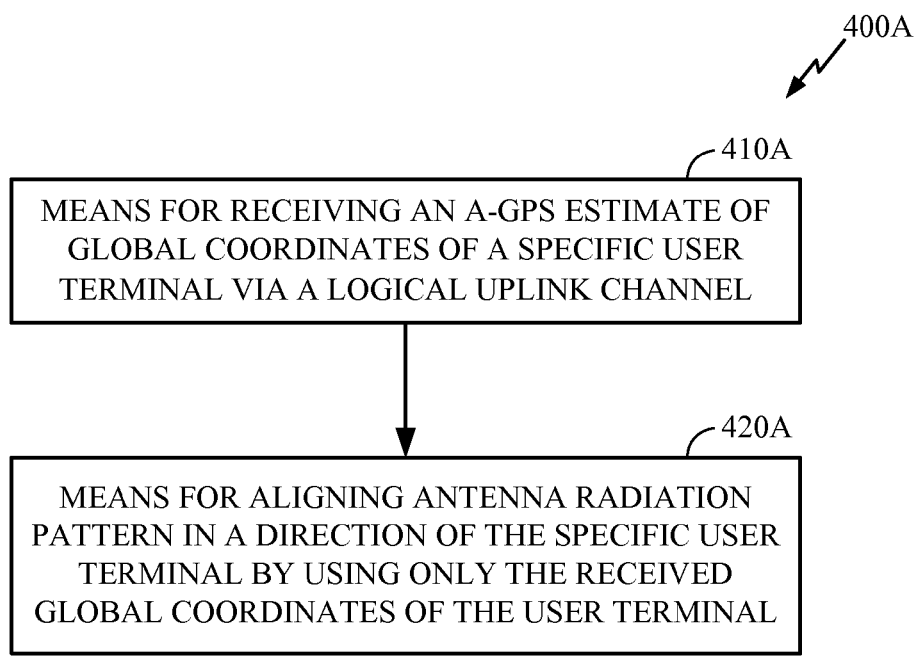
FIG. 4A illustrates example components capable of performing the operations illustrated in FIG. 4.
Figure 5A:
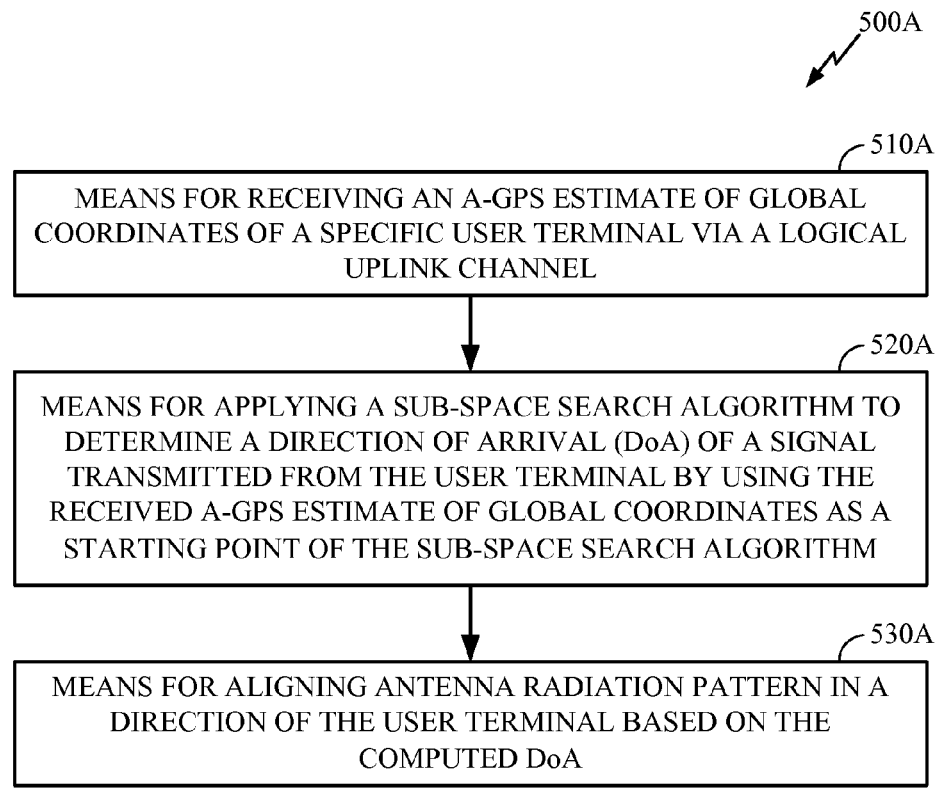
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 410-420 illustrated in FIG. 4 correspond to means-plus-function blocks 410A-420A illustrated in FIG. 4A. Similarly, blocks 510-530 illustrated in FIG. 5 correspond to means-plus-function blocks 510A-530A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for a wireless device, comprising:
receiving an Assisted Global Positioning System (A-GPS) estimate of global coordinates of an another wireless device;
using the received A-GPS estimate of global coordinates to determine a direction of arrival (DoA) of a signal transmitted from the other wireless device, wherein the received A-GPS estimate of global coordinates is used as a starting point of a sub-space search algorithm to determine the DoA of the signal transmitted from the other wireless device;
aligning an antenna radiation pattern at the wireless device based on the determined DoA; and
communicating with the other wireless device using the aligned antenna radiation pattern.

2. The method of claim 1, wherein receiving the A-GPS estimate of global coordinates of the other wireless device comprises receiving the A-GPS estimate of global coordinates via a logical channel.

3. The method of claim 1, wherein the wireless device is a base station, and wherein the other wireless device is a user terminal.

4. The method of claim 1, wherein the wireless device is a user terminal and the other wireless device is a base station.

5. The method of claim 1, wherein a plurality of antennas is used at the wireless device and at the other wireless device.

6. The method of claim 1, wherein the antenna radiation pattern is a beam pattern.

7. An apparatus for a wireless device, comprising:
 logic for receiving an Assisted Global Positioning System (A-GPS) estimate of global coordinates of an another wireless device;
 logic for using the received A-GPS estimate of global coordinates to determine a direction of arrival (DoA) of a signal transmitted from the other wireless device, wherein the received A-GPS estimate of global coordinates is used as a starting point of a sub-space search algorithm to determine the DoA of the signal transmitted from the other wireless device;
 logic for aligning an antenna radiation pattern at the wireless device based on the determined DoA; and
 logic for communicating with the other wireless device using the aligned antenna radiation pattern.

8. The apparatus of claim 7, wherein the logic for receiving the A-GPS estimate of global coordinates of the other wireless device comprises logic for receiving the A-GPS estimate of global coordinates via a logical channel.

9. The apparatus of claim 7, wherein the wireless device is a base station, and wherein the other wireless device is a user terminal.

10. The apparatus of claim 7, wherein the wireless device is a user terminal and the other wireless device is a base station.

11. The apparatus of claim 7, wherein a plurality of antennas is used at the wireless device and at the other wireless device.

12. The apparatus of claim 7, wherein the antenna radiation pattern is a beam pattern.

13. An apparatus for a wireless device, comprising:
 means for receiving an Assisted Global Positioning System (A-GPS) estimate of global coordinates of an another wireless device;
 means for using the received A-GPS estimate of global coordinates to determine a direction of arrival (DoA) of a signal transmitted from the other wireless device, wherein the received A-GPS estimate of global coordinates is used as a starting point of a sub-space search algorithm to determine the DoA of the signal transmitted from the other wireless device;
 means for aligning an antenna radiation pattern at the wireless device based on the determined DoA; and
 means for communicating with the other wireless device using the aligned antenna radiation pattern.

14. The apparatus of claim 13, wherein the means for receiving the A-GPS estimate of global coordinates of the other wireless device comprises means for receiving the A-GPS estimate of global coordinates via a logical channel.

15. The apparatus of claim 13, wherein the wireless device is a base station, and wherein the other wireless device is a user terminal.

16. The apparatus of claim 13, wherein the wireless device is a user terminal and the other wireless device is a base station.

17. The apparatus of claim 13, wherein a plurality of antennas is used at the wireless device and at the other wireless device.

18. The apparatus of claim 13, wherein the antenna radiation pattern is a beam pattern.

19. A computer-program product for a wireless device, comprising a computer readable medium having instructions stored thereon, the instructions being executable by one or more processors and the instructions comprising:
 instructions for receiving an Assisted Global Positioning System (A-GPS) estimate of global coordinates of an another wireless device;
 instructions for using the received A-GPS estimate of global coordinates to determine a direction of arrival (DoA) of a signal transmitted from the other wireless device, wherein the received A-GPS estimate of global coordinates is used as a starting point of a sub-space search algorithm to determine the DoA of the signal transmitted from the other wireless device;
 instructions for aligning an antenna radiation pattern at the wireless device based on the determined DoA; and
 instructions for communicating with the other wireless device using the aligned antenna radiation pattern.

20. The computer-program product of claim 19, wherein the instructions for receiving the A-GPS estimate of global coordinates of the other wireless device comprise instructions for receiving the A-GPS estimate of global coordinates via a logical channel.

21. The computer-program product of claim 19, wherein the wireless device is a base station, and wherein the other wireless device is a user terminal.

22. The computer-program product of claim 19, wherein the wireless device is a user terminal and the other wireless device is a base station.

23. The computer-program product of claim 19, wherein a plurality of antennas is used at the wireless device and at the other wireless device.

24. The computer-program product of claim 19, wherein the antenna radiation pattern is a beam pattern.

\* \* \* \* \*